Figure 1:
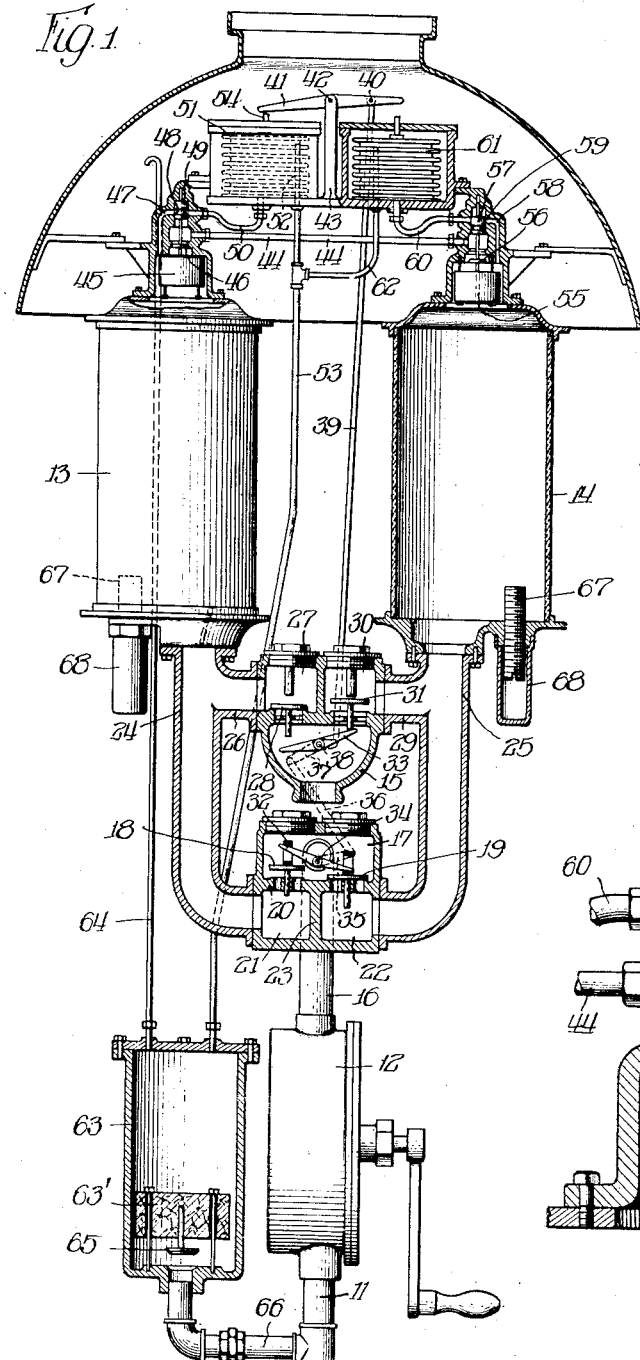

Feb. 23, 1932.  W. H. PARKER  1,846,899

LIQUID DISPENSING APPARATUS

Filed Oct. 15, 1925

Witness:
R. Burkhardt

Inventor:
Walter H. Parker,
By Wilkinson, Huxley, Byron & Knight
Attys.

Patented Feb. 23, 1932

1,846,899

UNITED STATES PATENT OFFICE

WALTER H. PARKER, OF ROCHESTER, PENNSYLVANIA, ASSIGNOR, BY MESNE ASSIGNMENTS, TO THE WAYNE PUMP COMPANY, OF BALTIMORE, MARYLAND, A CORPORATION OF MARYLAND

LIQUID DISPENSING APPARATUS

Application filed October 15, 1925. Serial No. 62,499.

This invention relates to liquid dispensing apparatus.

One object of the invention is to provide simple, reliable and efficient liquid dispensing apparatus which will permit a continuous flow of liquid to be measured and dispensed, thereby reducing to a minimum the time required for supplying a motor vehicle.

Aother object is to provide apparatus of the above mentioned type in which liquid is accurately measured and dispensed.

Another object is to alternately supply to each of a plurality of measuring chambers an excess amount of liquid to cause said liquid to overflow to insure dispensing an accurately measured quantity each time and to provide means for automatically controlling the sequence of supplying said chambers.

Another object is to provide apparatus of the constant flow type having two measuring chambers which are filled and emptied alternately, the flow being controlled by mechanism operable only after complete filling and emptying of the measuring chambers, and not operable by the operator, thus assuring a complete delivery and eliminating the possibility of either accidental or intentional short measuring of a delivery to a purchaser.

Another object is to control the various parts of the apparatus and the flow of liquid in a manner to meet all of the requirements for successful commercial use.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 2:
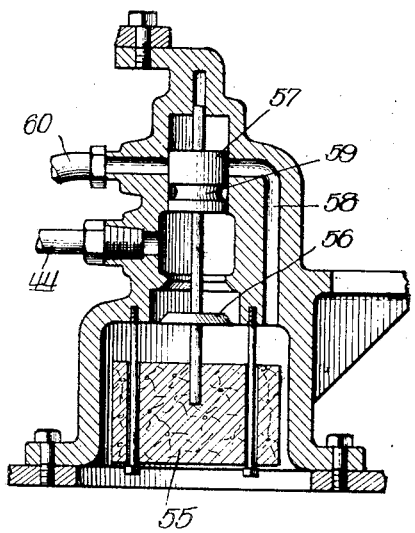

Figure 1 is a vertical longitudinal sectional view, some parts being in elevation, of liquid dispensing apparatus embodying my invention, and Figure 2 is an enlarged detail vertical sectional view of control means located at the tops of each of the measuring chambers.

Referring to the figures of the drawings, in which the apparatus is shown somewhat diagrammatically, it will be noted that liquid to be dispensed is drawn from any suitable storage tank 10 through a pipe 11 by a pump 12 and forced through control mechanism, to be described hereinafter, into measuring chambers 13 and 14, the latter of which preferably are in the form of transparent cylinders. The measuring chambers 13 and 14 alternately are filled and alternately emptied so that there is a continuous flow of liquid when a purchaser is being supplied, the discharge of the measured liquid being through a dispensing bowl 15 to which the usual dispensing hose may be connected.

A liquid supply pipe 16 which leads upwardly from the pump 12 is connected to an inlet valve compartment 17 in which two inlet control valves 18 and 19 are operable, said valves having seats in a horizontal partition 20 forming the floor of the inlet valve compartment 17 and forming the top of two other compartments 21 and 22 separated by a vertical wall 23. A conduit 24 connects the inlet compartment 21 with the lower end of the measuring chamber 13 and conduit 25 connects inlet compartment 22 with the lower end of the other measuring chamber 14. A branch discharge conduit 26 connects the lower end of measuring chamber 13 with a valve discharge compartment 27 having a discharge control valve 28 controlling the passage of discharge liquid from compartment 27 to the discharge bowl 15. Similarly, a branch discharge conduit 29 connects the lower end of the measuring chamber 14 with the discharge compartment 30, there being a discharge control valve 31 for controlling the passage of discharge liquid from the compartment 30 into the discharge bowl 15.

With the valves 18, 19, 28 and 31 as shown in Figure 1, liquid is being pumped through supply pipe 16, past inlet valve 18 and through conduit 24 into measuring chamber 13. At the same time, a measured quantity of liquid is being discharged from measuring chamber 14 through conduit 29, past valve 31 and out through discharge bowl 15. As shown in Figure 1, valves 28 and 19 are held closed by gravity and by fluid pressure, and valves 18 and 31 are held open by rocking bars 32 and 33 respectively. Rocking bar 32 is mounted on a shaft 34 to which an arm 35 is secured. A link 36 connects the free end of arm 35 with the free end of another arm 37 secured to a shaft 38 upon which rocking bar or cross beam 33 is mounted. A rod 39 is operatively connected to the shaft 38 through an arm (not numbered) and accordingly to the shaft 34, through arms 37, link 36 and arm 35 for actuating said rocking bars or cross beams 32 and 33, and accordingly the inlet control valves 18 and 19 and discharge control valves 28 and 31. This rod 39 is pivotally connected at 40 to a beam 41 pivotally mounted intermediate its ends at 42 upon a support 43, so that actuation of the cross beam 41 causes reversing movement of the inlet and discharge control valves in question. Such reversing movements will be considered further in connection with means which control reversing movement of said valves.

As liquid is being pumped into and accordingly rises in measuring chamber 13, air is discharged from the upper end of said measuring chamber through a pipe 44 into the top of the other measuring chamber 14 from which liquid is being discharged. As shown in Figure 1, the measuring chamber 13 has been filled with liquid to the extent that a float 45 has been raised into a position such that a valve 46 which it carries has been closed. Accordingly, no further air may be discharged through the air transfer pipe 44. However, if there is any further air in the upper part of the liquid filled chamber, it passes upwardly out through the exposed passageway 47, through the annular grooved passageway 48 of a valve 49 also carried and controlled by float 45, the air then continuing to flow through a pipe 50 into bellows 51. By closing the valve 46, not only is further air prevented from passing through the air pipe 44 but liquid is prevented from passing therethrough. However, not only air but also liquid may pass through the passageways 47, 48 and 50 into the bellows 51. In this connection, it will be noted that combined vent and overflow pipe 52 is provided within the bellows 51 which permits a ready escape of air from the bellows but because of its relative smallness in size compared with the pipe 50, restricts or limits the rate of overflow of liquid from bellows 51 down through the pipes 52 and 53. Due to this restriction of liquid overflow from bellows 51, liquid pressure is built up in bellows 51 for expanding the same, lifting stem 54 into engagement with cross beam 41 and rocking the latter for reversing the inlet control valves 18 and 19 and discharge control valves 28 and 31, whereby liquid will now be permitted to discharge from the measuring chamber 13 through the connections described and liquid supplied to the other measuring chamber 14 through connections described. As the liquid lowers in measuring chamber 13, liquid is being pumped into and accordingly rises in measuring chamber 14. As a result thereof, air in the upper portion of measuring chamber 14 is discharged through the air pipe 44 into the top of measuring chamber 13, it being understood that as the liquid lowers in the latter chamber, the float 45 lowers for opening valve 46 and closing valve 49. Here again the air discharged through air pipe 44 continues until the float 55 lifts the valve 56 which it carries into closed position for preventing a further transfer of air to measuring chamber 13 through the air pipe 44. When the air valve 56 is closed, the slide valve 57 also controlled by the float 55 is moved into an open position so that air and liquid may flow through the passageway 58, annular groove 59 in the valve 57 and through pipe 60 into the other bellows 61. The air passing into bellows 61 readily escapes through branch overflow pipe 62 into main overflow pipe 53, but here again due to the fact that pipe 62 is smaller in internal diameter than the pipe 60, flow of liquid from the bellows 61 through the overflow pipe 62 is restricted. Accordingly, pressure is built up in the bellows and eventually causes beam 41 to rock back into the position shown in Figure 1, and reversing the valves back into the position shown in Figure 1 for permitting discharge of the measured liquid from chamber 14 and permitting a supply of liquid to be measured to chamber 13. Thus it is apparent that the inlet and discharge valves cannot be reversed until the measuring chambers are alternately completely filled and completely emptied.

The liquid which overflows through main overflow pipe 53, which acts in common for overflow from both measuring chambers 13 and 14, is connected to the top of an overflow tank 63 which is vented by a vent pipe 64. Mounted in the overflow tank 63 is a float 63' carrying a valve 65 for controlling the flow of overflow liquid from the tank 63 to the supply line 11. When liquid in the overflow tank has risen to an extent causing the float 63' and accordingly the valve 65 to rise, such overflow liquid may be drawn by the pump 12 out through the connection 66 into the supply pipe 11 and upwardly through the pump 12. When a predetermined amount of liquid has been discharged from the overflow tank 63, valve 65 is permitted to move into closed position. There is always a certain amount of liquid within the tank 63 for acting as a seal against the passage of air into pipe 66 and supply pipe 11. Calibrating plugs 67 are provided for calibrating the measuring chambers 13 and 14 respectively. When the position of the calibrating plugs 67 is determined, sealing caps 68 are secured thereover.

It is my intention to cover all modifications falling within the spirit and scope of the invention as set forth in the following claims.

I claim:

1. In liquid dispensing apparatus, the combination of a plurality of measuring chambers, means having a capacity for supplying said chambers until liquid overflows, means for controlling the flow of liquid to said chambers, expansible means responsive to the action of overflow of liquid for controlling the last named means, and control means for controlling the supply of overflow liquid to said expansible means, said last named control means including valve means operable by the liquid supplied to said chambers.

2. In liquid dispensing apparatus, the combination of a plurality of measuring chambers, means having a capacity for supplying said chambers until liquid overflows, valve mechanism for controlling the flow of liquid to and discharge of liquid from said chambers, means including a bellows responsive to the action of overflow liquid for controlling said valve mechanism, and control means for controlling the supply of overflow to said bellows, said last named control means including valve means operable to open position by liquid supplied to said chambers.

3. In liquid dispensing apparatus, the combination of a plurality of measuring chambers, means having a capacity for supplying said chambers until liquid overflows, means for controlling the flow of liquid to said chambers, means including a bellows operatively connected to each of said chambers and to said control mechanism whereby excess liquid from either of said chambers enters one of said bellows to move the same to cause a change in the supply of liquid from one chamber to another, and means including a conduit connecting said chambers whereby as liquid passes into one of said chambers air passes therefrom and into another of said chambers.

4. In liquid dispensing apparatus, the combination of a plurality of measuring chambers, means having a capacity for supplying said chambers until liquid overflows, a supply line connected to said means, means controlled by the excess supply of liquid to change the supply flow of liquid from one chamber to another, and means including a receptacle connected with a supply line for receiving and controlling the discharge of overflow liquid back into the supply line, said receptacle having a normally closed valve operable after a predetermined amount of liquid is received in the receptacle and to discharge said liquid back to the supply line whereby no liquid in said chambers is exhausted by said first named means.

5. In liquid dispensing apparatus, the combination of a plurality of measuring chambers adapted to be supplied to an overflowing condition, a liquid supply source, means operatively connected to said liquid supply source and said measuring chambers whereby as one of said chambers is being supplied with liquid the other is discharging liquid, means operated by the overflow and operative upon said other means whereby the condition of supply of liquid to and discharge of liquid from said chambers is changed after overflow condition prevails in one of said chambers, and overflow means in common for both of said measuring chambers, said overflow means including a connection to said source, and means controlling the connection whereby supply to said chambers does not exhaust liquid from said chambers.

6. In liquid dispensing apparatus, the combination of a plurality of measuring chambers, a liquid supply source, means operatively connected to said liquid supply source and said measuring chambers whereby as one of said chambers is being supplied with liquid another is discharging liquid, means operated by the overflow and operative upon said other means whereby the condition of supply of liquid to and discharge of liquid from said chambers is changed, and valve controlled overflow means in common for both of said measuring chambers, said overflow means including a connection to said source, the connection being controlled by said valve whereby supply from said source does not exhaust liquid from said overflow means.

7. In liquid dispensing apparatus, the combination of a plurality of measuring chambers, a liquid supply source, means operatively connected to said liquid supply source and said measuring chambers whereby as one of said chambers is being supplied with liquid the other is discharging liquid, means operated by the overflow and operative upon said other means whereby the condition of supply of liquid to and discharge of liquid from said chambers is changed, a valve controlled overflow means in common for both of said measuring chambers, said overflow means including a connection to said source, the connection being controlled by said valve whereby supply from said source does not exhaust liquid from said overflow means, and an air connection between said measuring chambers whereby air may flow from the chamber being filled into the chamber being emptied.

8. In liquid dispensing apparatus, the combination of a measuring chamber, means for supplying liquid thereto, diverting means for diverting the liquid from said chamber when said chamber has been filled, control means normally out of communication with said chamber for operating said last named means, means operated by the liquid level in said chamber when said chamber is filled for putting said control means in communication with said chamber whereby said chamber supplies liquid to said control means for actuating said control means to operate said diverting means.

9. In liquid dispensing apparatus, the combination of a measuring chamber, means for supplying liquid thereto, means for discharging liquid therefrom, means associated with said last named means for permitting supply of liquid to said chamber, control means connected to said chamber for operating said last two mentioned means, and means controlled by liquid level in said chamber for directing liquid to said control means for operation of said control means for actuating said third named means.

10. In liquid dispensing apparatus, the combination of a plurality of measuring chambers, valve means, means having a capacity for supplying said chambers until liquid overflows, operating means for changing liquid supply from one chamber to another, normally closed conduits through which the excess liquid overflows from said chambers when said chambers are filled, said conduits being closed by said valve means, said valve means being movable to open position by said excess liquid thereby opening a passage through said conduits, and means for receiving the excess liquid from said conduits and controlled by the excess supply of liquid for actuating said operating means to change the supply flow of liquid from one chamber to another.

11. In liquid dispensing apparatus, the combination of a measuring chamber, supply means therefor, control means in said supply means for controlling supply to and discharge from said chamber, operating means communicating with said chamber for operation of liquid therefrom for said control means, and means in said chamber for controlling liquid supply to said operating means for actuating said operating means.

12. In liquid dispensing apparatus, the combination of a measuring chamber, supply and discharge means therefor, control means in said supply and discharge means for controlling supply to and discharge from said chamber, operating means communicating with said chamber for operation of liquid therefrom for said control means, and liquid level controlled means in said chamber for controlling liquid supply to said operating means for actuating said operating means.

13. In liquid dispensing apparatus, the combination of a measuring chamber, a conduit in communication therewith, said conduit having associated members for controlling supply to and discharge from said chamber, control means operatively connected to said associated members and communicating with said chamber, and means in said chamber normally cutting off communication of said control means with said chamber but operable to control operation of said control means whereby said associated members are actuated to determine the supply to and discharge from said chambers.

14. In liquid dispensing apparatus, the combination of a pair of measuring chambers, means for pumping liquid from a source of liquid supply alternately to said measuring chambers at a constant rate, a valve device connected to said means for directing the flow of liquid alternately to said measuring chambers, said valve device having alternately opening and closing valves for directing the flow of liquid, discharge means for directing the flow of liquid from said chambers, said discharge means including valves operated to open position to discharge only after filling of said chambers, control means for said valve device and said discharge means, said control means including movable members connected to the valves of said valve device and said discharge means to operate the same whereby when one chamber is filling the other is discharging, a portion of said control means being in communication with said chambers, a normally closed valve in each chamber operable by the liquid in each chamber to open communication between said chamber and the portion of the control means whereby excess liquid operates said control means to actuate said valves.

15. In liquid dispensing apparatus, the combination of a pair of measuring chambers, means for pumping liquid from a source of liquid supply alternately to said measuring chambers at a constant rate, a valve device connected to said means for directing the flow of liquid alternately to said measuring chambers, said valve device having alternately opening and closing valves for directing the flow of liquid, discharge means for directing the flow of liquid from said chambers, said discharge means including valves operated to open position to discharge only after filling of said chambers, control means for said valve device and said discharge means, said control means including movable members connected to the valves of said valve device and said discharge means to operate the same whereby when one chamber is filling the other is discharging, a portion of said control means being in communication with said chambers, a normally closed valve in each chamber operable by the liquid in each chamber to open communication between said chamber and the portion of the control means whereby excess liquid operates said control means to actuate said valves, said normally controlled valve being so arranged that flow of liquid is in only one direction therethrough, overflow receiving means connected to said control means and to said first named means, said overflow receiving means having a normally closed valve therein operable by liquid level in said receiving means for discharging liquid therefrom to said first named means whereby pumping liquid from said source closes said last named valve to prevent suction of liquid from said chambers.

Signed at Rochester, Pennsylvania, this 5th day of October, 1925.

WALTER H. PARKER.